United States Patent [19]

Tsutsui et al.

[11] Patent Number: 4,772,788
[45] Date of Patent: Sep. 20, 1988

[54] CORONA DISCHARGE TREATING SYSTEM

[75] Inventors: Koichi Tsutsui, Kyoto; Shoji Ikeda, Osaka, both of Japan

[73] Assignee: Nippon Paint Co., Ltd., Osaka, Japan

[21] Appl. No.: 872,582

[22] Filed: Jun. 10, 1986

[30] Foreign Application Priority Data

| Dec. 25, 1985 | [JP] | Japan | 60-295327 |
| Dec. 25, 1985 | [JP] | Japan | 60-295328 |
| Dec. 25, 1985 | [JP] | Japan | 60-295329 |
| Dec. 25, 1985 | [JP] | Japan | 60-295330 |
| Dec. 25, 1985 | [JP] | Japan | 60-295331 |

[51] Int. Cl.$^4$ .......................................... H01T 19/04
[52] U.S. Cl. .................................... 250/324; 250/325
[58] Field of Search .................... 250/324, 325, 326; 361/225, 229, 230, 232, 233

[56] References Cited

U.S. PATENT DOCUMENTS

| 2,550,366 | 4/1968 | Meaker et al. | 219/69 M |
| 3,146,385 | 8/1984 | Carlson | 250/325 |
| 3,183,352 | 5/1965 | Brandt et al. | 250/324 |
| 3,233,156 | 2/1966 | Jarvis et al. | 250/325 |
| 3,254,215 | 5/1966 | Oliphant | 250/325 |
| 3,293,652 | 12/1966 | Roshon, Jr. et al. | 219/69 R |
| 3,402,279 | 9/1968 | Sazhin | 219/69 M |
| 3,405,052 | 10/1968 | Schirmer | 250/324 |
| 3,483,374 | 12/1969 | Erben | 250/324 |
| 3,794,839 | 2/1974 | Hayne | 250/324 |
| 4,049,414 | 9/1977 | Smith | 65/4 B |
| 4,064,386 | 12/1977 | Numrich et al. | 219/68 |
| 4,103,137 | 7/1978 | Levitt et al. | 219/69 W |
| 4,275,301 | 6/1981 | Rueggeberg | 250/326 |
| 4,425,496 | 1/1984 | le Fur et al. | 219/384 |
| 4,467,200 | 8/1984 | Kalwer et al. | 250/324 |

FOREIGN PATENT DOCUMENTS 3343063 6/1985 Fed. Rep. of Germany ...... 250/325

Primary Examiner—Bruce C. Anderson
Assistant Examiner—Paul A. Guss
Attorney, Agent, or Firm—Armstrong, Nikaido, Marmelstein & Kubovcik

[57] ABSTRACT

A corona discharge treating system wherein in order that the corona discharge treatment can be performed efficiently and securely on any product of complicated shape having a large number of different faces to be treated, the system is equipped with conveying means for conveyance of the article, a plurality of discharge electrodes are disposed along the conveying direction of the article, each of these discharge electrodes performs activation of a part of the surface to be treated by sharing, the whole surface to be treated can be activated when said article has passed through all these discharge electrodes, thereby enabling the surface treatment to be continuously made, while conveying the article.

Complicated shape articles may be subjected to continuous and secure corona discharge treating without stagnation.

19 Claims, 14 Drawing Sheets

CORONA DISCHARGE TREATING SYSTEM

BACKGROUND OF THE INVENTION

The present invention relates to a treating system with corona discharge designed for improvement of surface property of an article by activating its surface.

Japanese Patent Publication (examined) No. 60-46133 discloses a technique related to a corona discharge treating apparatus. This treating apparatus with corona discharge is designed to subject to articles having a large number of surfaces to be treated, and in which a base electrode is installed on a transfer means, i.e., a conveyor belt; an article is mounted on this base electrode and a fibrous (brushlike) discharge electrode (counter electrode) is arranged thereabove.

What is characteristic of this prior art is that all surfaces of a complicated shape of article with many surfaces are concentrically subjected to discharge treatment together by a base electrode and a discharge electrode. Accordingly, in order to ensure the discharge treatment, it is necessary to perform the discharge treatment in such a manner that the article is stopped once at a position where the discharge electrode is located, and that then the article is moved as slow as possible. By such known treating apparatus, however, a problem exists in that the discharge treatment cannot be performed efficiently thereby not being adaptable for mass-production.

U.S. patent application Ser. No. 759,434 filed previously by the applicant also discloses a technique related to the corona discharge. This apparatus comprises an excitation electrode and a counter electrode opposed to the excitation electrode, with a conductive and flexible contact piece provided on either one of them. This prior art is designed for stable and uniform treatment of an article having a complicated shape, but does not give a solution for efficient excecution of surface treatment by assembly line operation of products having a large number of surfaces to be treated.

Similarly, the Japanese Patent Application No. 59-237735 filed by the applicant discloses a method of performing a surface treatment in which high voltage is applied between an excitation electrode and a counter electrode, thereby forming a discharge region between these two electrodes, and, then, gas is supplied into this discharge region to treat the surfaces of the articles. This process intends to improve discharge treatment efficiency by supplying gas, but still does not teach the method of executing the surface treatment of products of complicated shape in large quantities.

OBJECT OF THE INVENTION

It is, therefore, an object of this invention to provide a novel treating system with corona discharge in which high productivity in mass-production is achieved through efficient discharge treating of products having complicated shape.

BRIEF SUMMARY OF THE INVENTION

This invention provides a corona discharge treating system. A plurality of discharge electrodes, each activating only a part of the article are provided along the conveying direction thereof, and the whole surface of the article to be treated is completely activated by means of all these discharge electrodes while conveying the article, for attainment of high productivity through efficiency increase in discharge treatment.

DETAILED DESCRIPTION OF THE INVENTION

Figure 1:
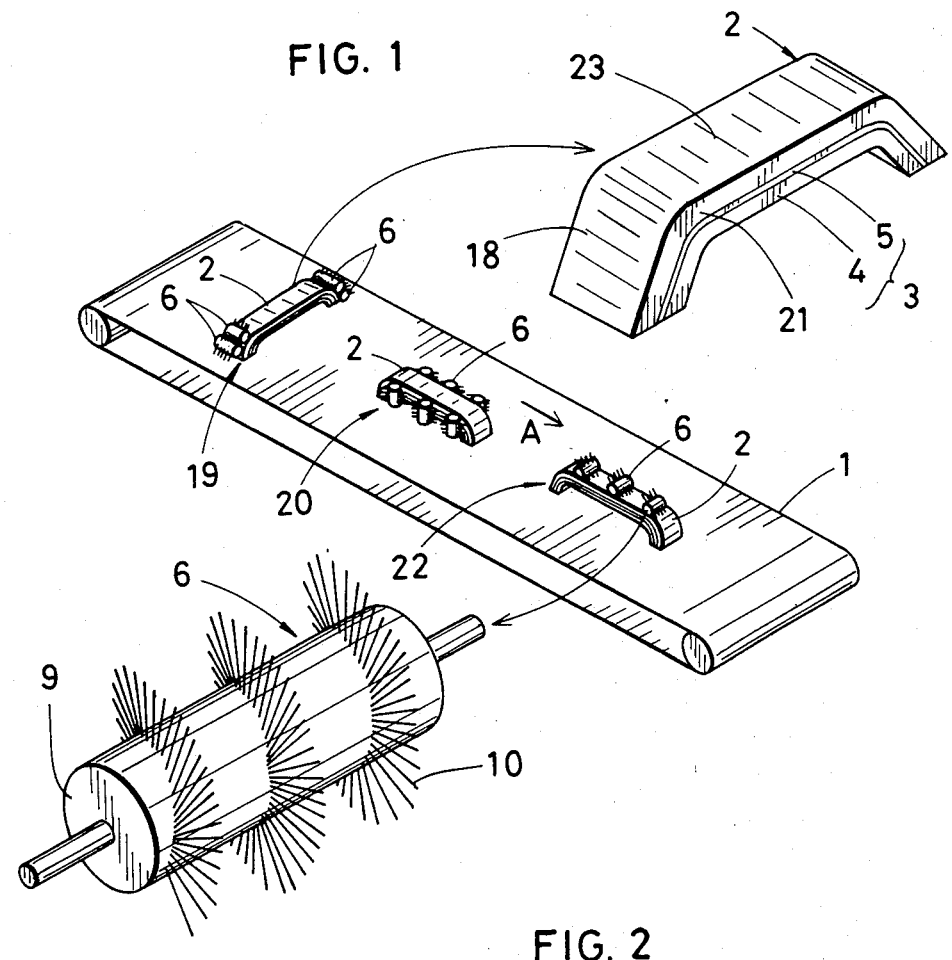
FIG. 1 is a sketch of an example of corona discharge treating system of this invention, as seen from obliquely above.
Figure 2:
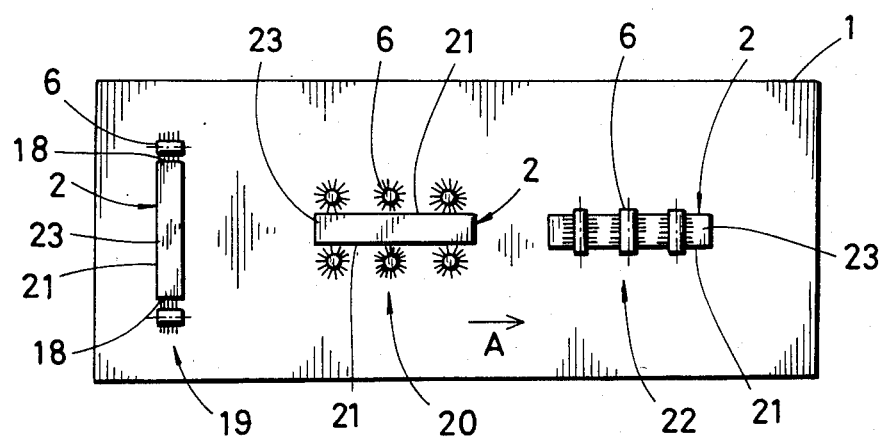
FIG. 2 is a plane view of the system of FIG. 1.
Figure 3:
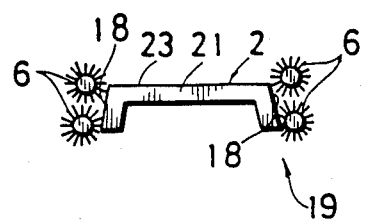
FIG. 3 is a front view showing the end treating zone indicated in FIG. 1.
Figure 4:
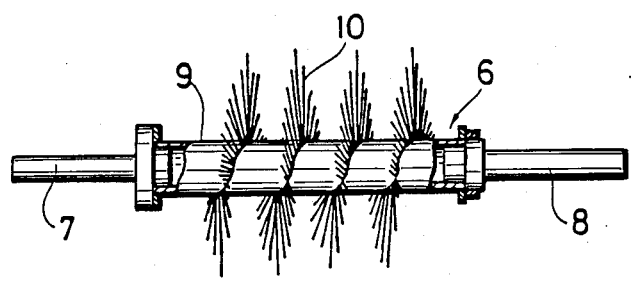
FIG. 4 is a partly fragmentary front view of a rotary discharge electrode.

FIGS. 1 through 3 illustrate a corona discharge treating system according to an embodiment of this invention. This corona discharge treating system comprises a conveying means 1 to convey articles carried thereon. In this example, the article 2 designates an automobile bumper made of polyolefin resin material which has a large number of faces to be treated which are turned to different directions. The conveying means 1 is a conveyor belt, with the arrow A showing the moving direction. On the conveying means 1, a base electrode 3 is installed and, then, the article 2 is mounted thereon. The base electrode 3 has a surface configuration matched to the inside surface configuration of each article 2, to be in contact therewith. This base electrode 3 comprises a plastic mold 4 and a conductive metal layer 5 formed by applying a conductive coating on its surface turned to the article. As the method for applying the conductive coating, the electroless plating is employed. However, the method should not be limited to it, but such methods as applying conductive coating, vapor deposition or pasting an aluminum foil or conductive tape, etc., may be used. The base electrode may be composed of a conductive mold of aluminum, etc., for example. As seen from the drawing, the corona discharge treating system is equipped with a plurality of rotary discharge electrodes 6 along the conveying direction indicated by the arrow A in the conveyor 1. Each of these plurality of rotary type discharge electrodes 6 shares activation of a part of the surface to be treated of the article, and disposed being divided into three groups each comprising several electrodes. Different treating zones 19, 20, 22 are respectively formed by regions wherein the plurality of rotary type discharge electrodes 6 divided into three groups are disposed. The rotary discharge electrode 6 is, as shown in FIG. 4, equipped as a body with a cylindrical rotary member 9 affixed between a flanged first shaft 7 and second shaft 8 which are paired. On the external circumference of the rotary member 9, a large number of electrode pieces 10 are implanted projecting like a brush.

Figure 5:
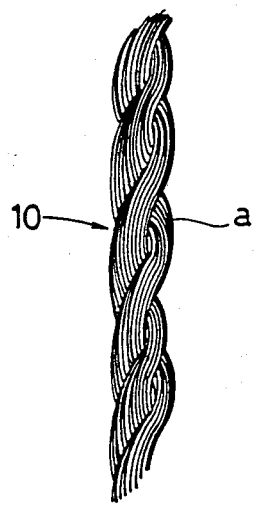
FIG. 5 is a front view showing the details of the plied state of electrode piece to be implanted in the discharge electrode.

The electrode pieces 10 is not formed of a single string, but formed into a string by plying numerous stainless steel fibers a, as shown by its detail view of FIG. 5. A large number of electrode pieces 10 of same length are prepared and planted at points b set in a spiral pattern on the outer circumference of the rotary member 9. The planting points b are set at definite intervals along a spiral line. Each electrode piece 10 implanted at each point b is extending, inclined at a small angle (projection angle) $\theta$ in a direction along the central axis 0 of the rotary member 9 from the reference line c drawn normal to the outer circumferential surface of the rotary member 9.

Figure 6A:
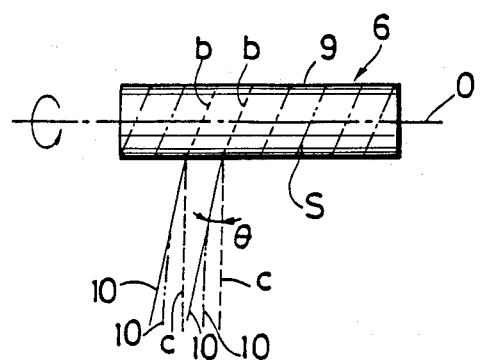
FIG. 6(a) is an explanatory diagram showing the state of electrode pieces implanted in a rotary body.
Figure 6B:
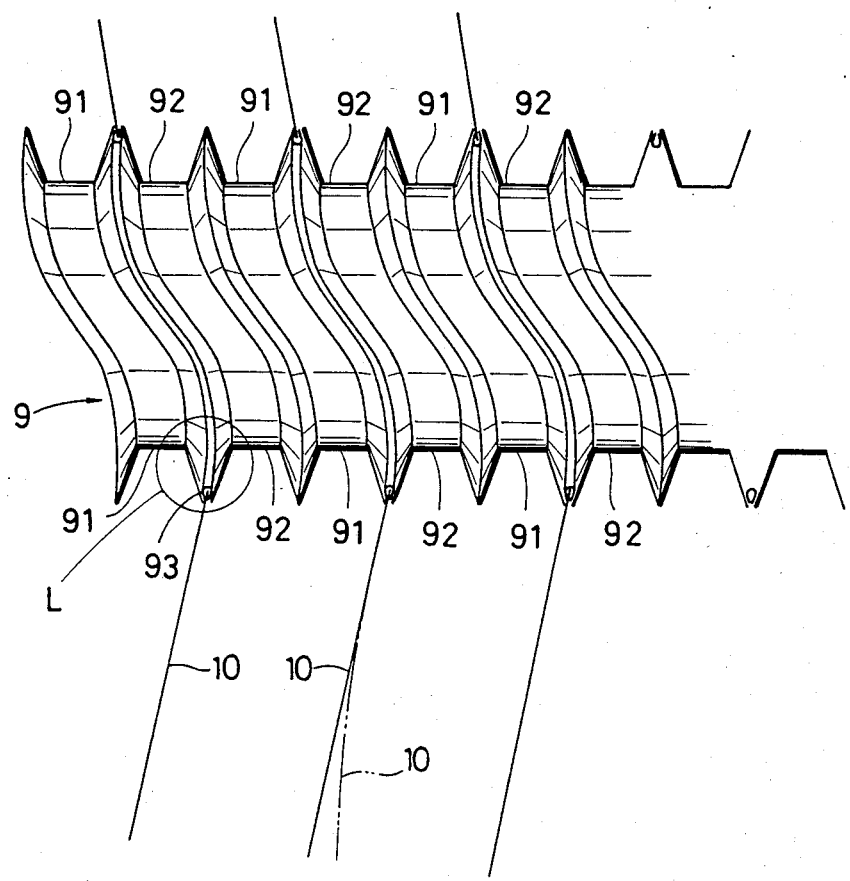
FIG. 6(b) is an explanatory diagram of the rotary body formed by combination of spiral shape members to have a structure adapted to hold the electrode pieces.

As seen from the enlarged view of the implanted essential part in FIG. 6(b), the rotary member 9 consists of first and second spiral members 91 and 92. The first spiral member 91 is a spring material being nearly rectangular groove in section and somewhat expanded on the opening side. The second spiral member is similar in structure as the first spiral member 91. The first and the second spiral members 91 and 92 are so combined as to form adjacent, parallel spirals by mutual engagement and coupled by mutual spring forces. Between neighboring members at each alternate another position of spirals, a coil spring shape electrode fitting member 93 being U-shaped in section is inserted. The electrode piece 10 is fixed by caulking at its root inside the U-shape groove of the electrode fitting member 93. A large number of such pieces are arranged around the member in its circumferential direction. The electrode piece is, as hereabove mentioned, inclined by an angle of $\theta$ in the axial direction of the rotary member 9 from the normal reference line c extending in its radial direction which is indicated by a broken line. As the electrode piece 10 is oriented in this manner, its distal end can touch not only on the front surface of the article 2 but on its lateral sides and besides, can come in proper touch with corners 94 of a recess as represented by a two dots and a dash alternating line in FIG. 6(c) or any projections, thereby enabling the surface treatment to be made efficiently. This angle $\theta$ may be set larger or smaller by altering the rise angle $\alpha$ of flanges 91a and 92a of the spiral members 91 and 92. The electrode piece 10, when not turning, is not straightly rising up like so-called piano wire as indicated by a real line in FIG. 6(c), but is formed by twisting fine fibers and is, therefore, in a sinuous state as represented by a dot and a dash alternating line in FIG. 6(c). Or its distal end is drooped, but under the centrifugal force, as it is turned, the electrode piece 10 gradually rises up to the state as shown by a real line in FIG. 6(c). If it comes under still stronger centrifugal force, it finally comes into an arcuate state as indicated by two dots and a dash alternating line after passing this real line state.

On the electrode piece 10, normally, plastic (resin) coating is applied. To provide the plastic (resin) coating, solutions of various types of plastics (resins) which are excellent in heat resistance, wear resistance and flexibility may be used. Mentioned as examples may be acrylic resin, vinyl resin, polyester resin, epoxy resin, polyamide resin, polyimide resin, melamine resin, fluorine resin, silicone resin, etc.

Figure 7:
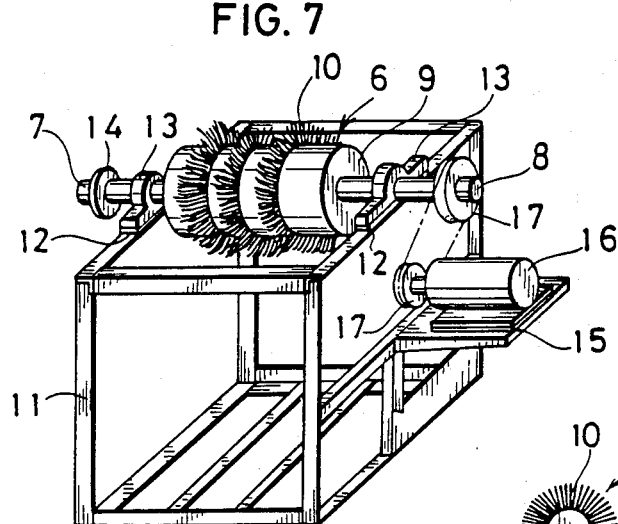
FIG. 7 is a perspective view of a rotary discharge electrode showing its installed state.

The rotary discharge electrode 6 is rotatably supported by a pair of plumber blocks 13 mounted on a supporting frame 11 of an insulating material 12 (bakelite or teflon is used) interposed therebetween, as shown in FIG. 7. On one end of the rotary discharge electrode 6, is mounted a bearing 14 for sending an electric current, while on the other end, a pulley 17 is carried. This pulley 17 is belt (insulator)-driven by means of a variable speed motor 16 with an insulator 15.

Figure 8:
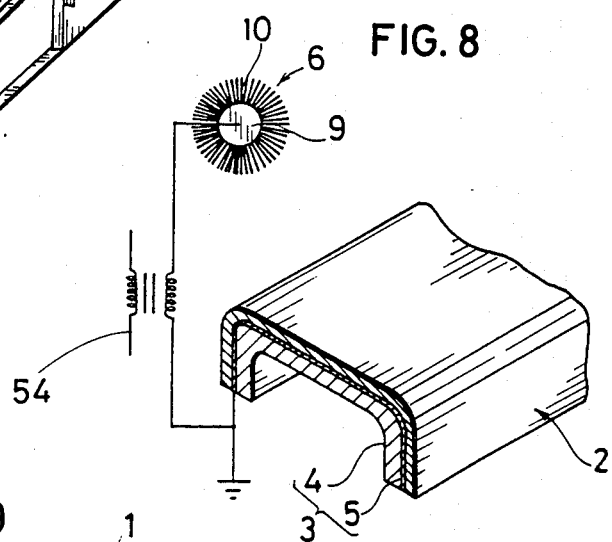
FIG. 8 is a wiring diagram of a rotary discharge electrode and a base electrode.

The base electrode 3 and the rotary discharge electrode 6 are, as seen in FIG. 8, respectively linked to a high frequency power source 54. By applying a high voltage between the two electrodes 3 and 6, the surface of the article 2 which is brought in contact with the electrode pieces of the rotary discharge electrode 6 is subjected to a discharge treatment, thereby to be activated.

Returning now to FIGS. 1 through 3, respective treatment zones 19, 20 and 22 are described. As seen in these drawings, in the treatment zone 19, the rearmost side position in conveying direction A, the article 2 is arranged to have its longitudinal direction turned to criss-cross to conveying direction A, while its inward side turned downward. In this treatment zone 19, the rotary discharge electrodes 6 are so installed that as they are rotated, the distal end of each electrode piece 10 is brought in contact with the outside surfaces 18 on both ends in the longitudinal direction of the bumper, to be raised in that state along the outside surfaces 18. In this embodiment, 4 rotary discharge electrodes 6 are prepared; each pair of them as a set is arranged on each outside surface, with all the axial lines of the discharge electrodes held parallel to conveying direction A. These rotary discharge electrodes 6 are in set places, as seen in the plane view, but go up along the outside surfaces 18 of the article 2, meanwhile corona discharge is induced by the high voltage applied between them and the base electrode 3. It is also possible to have a system of raising the article 2, while keeping the rotary discharge electrodes 6 stationarily in place or not permitting their upward motion. This treatment zone 19 is herein called end faces treating zone.

In the treatment zone 20 on the advancing side of conveying direction A from the end treating zone 19, the longitudinal direction of the article 2 is turned parallel to conveying direction A, while its inside surface side turned downward. This treatment zone 20 is herein called sides treating zone. The turning of the direction of the article 2 may be simply realized by mounting the article on a treating table being a turntable in a 90-degree arc. The rotary discharge electrodes 6 are so composed that three each of them are correspondingly arranged on each side 21 of the article 2, with their central axial lines turned in the direction criss-crossing to conveying direction A, to thereby subject both sides 21 and 21 of the article 2 to the discharge treatment. The rotary discharge electrodes 6 in this sides treating zone 20 may be installed, with the direction of the rotary central axis turned parallel to conveying direction A.

In the treatment zone 22 located at a position on the front-most side in conveying direction A, the article 2 is arranged in the same state as in the side treatment zone 20. The rotary discharge electrodes 6 are so composed that three of them are arranged on the top surface 23 of the article 2, with their rotary central axis turned in the direction criss-crossing to conveying direction, thereby to subject the top surface 23 of the article 2 to the discharge treatment. This treatment zone is called top surface treatment zone.

The article 2 carried on the conveying means 1 is transferred in the order of end surface treating zone 19—sides treating zone 20—top treating zone 22, meanwhile the outside surface 18 and 18 are subjected to the discharge treatment in the ends treatment zone 19, both side surfaces 21 and 21 in the sides treating zone, and the top surface in the top treating zone, respectively. In this manner, the article is supposed to pass through the three treating zones 19, 20, 22, and the whole surface to be treated is activated by passing through all of the plurality of rotary discharge electrodes 6.

As hereabove described, in the corona discharge treating system, in effect, the treating system of this embodiment is provided with conveying means for conveyance of the article, a plurality of discharge electrodes are disposed in the conveying direction of the article, each of these discharge electrodes performs activation of a part of the surface to be treated of the article so that the whole surface of the article may be completely treated when the article has passed through all of these discharge electrodes, and, as a result, even when treating an article with many surfaces respectively facing to different directions, treatment thereof by using corona discharge can be efficiently performed, enabling thereby mass production of surface treated products. Furthermore, since each of the plurality of discharge electrodes performs activation of a part of the surface to be treated in the form of taking over a partial surface treatment work, it becomes easy to perform the treatment under the condition most preferable for treating each part of the surface to be treated of the article, and, as a result, every part of the surface to be treated can be exactly activated.

Figure 9:
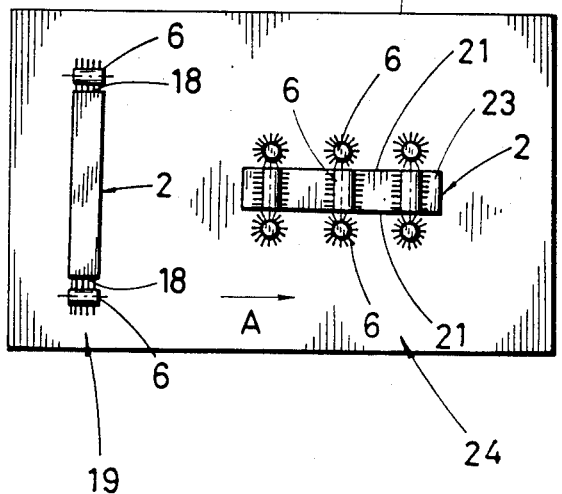
FIG. 9 is a plane view showing another example in which the upper and side treatment zones are unified.

As shown in FIG. 9, it is also acceptable to compose a top and sides simultaneous treating zone 24 by unifying the sides and top treating zones in the said embodiment. Of the rotary discharge electrodes 6 in this treatment zone 24, those corresponding to both side surface 21 of the article 2 have their central axial lines held perpendicular to conveying direction A, but they may be placed parallel thereto.

Figure 6C:
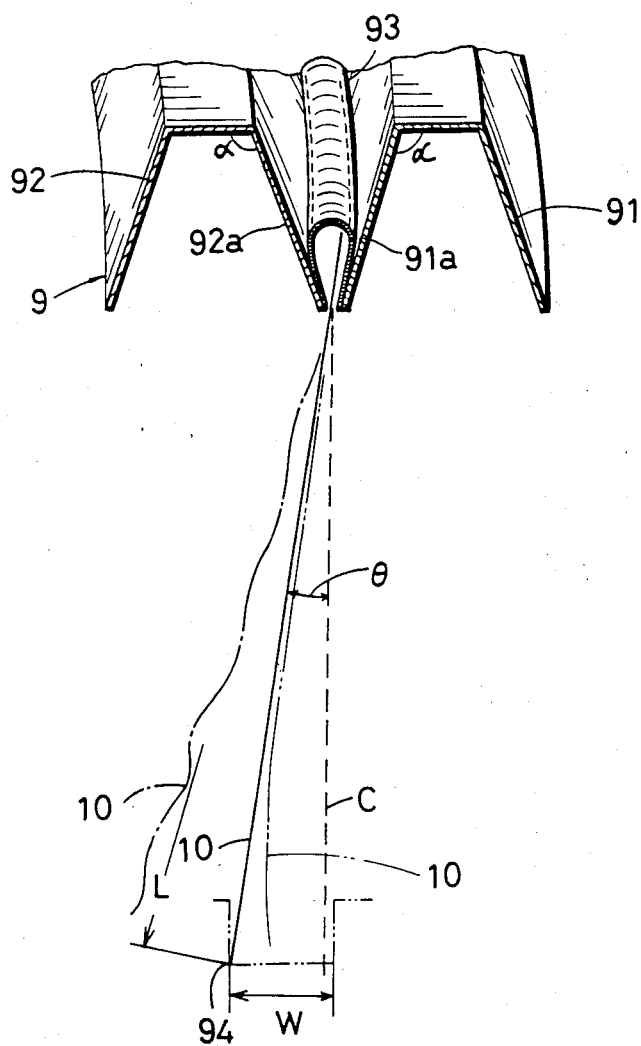
FIG. 6(c) is an enlarged view of the L part indicated in FIG. 6(b)

In the embodiment, various conditions for elevating the treatment efficiency and the treatment effect are as follows: One of them is the projection angle $\theta$. This angle $\theta$ is so set that, as shown in FIG. 6(c), the distal end of the electrode piece 10 can be more surely brought in contact with the corner 94 of the bottom of the recess formed in the article 2. For example, when the discharge treatment is applied on a recess with its groove width W falling in the range of 10-55 mm (actually measured), independently using two types of electrode piece having lengths L 100 mm and 150 mm, with use of the electrode piece 10 having a length L of 100 mm, the contact on the corner 94 of the recess is possible, if $\theta$ falls in the range of approx. 6°-30°, while contact is possible, if $\theta$ falls in the range of approx. 5°-20°, when the electrode piece 10 having a length L of 150 mm is used. With regard to the angle $\theta$, although other conditions are involved, if it is too small, the electrode piece 10 tend to be superposed on each other and, then, entangled, resulting in reduced treatment efficiency. If $\theta$ is too large, the treatment effect will decline. The implanting density of the electrode pieces 10 should be somewhat differentiated according to the composition itself of the electrode pieces 10. But when the discharge treatment is executed individually with use of electrode pieces 10 at density divisions of 2, 4, 10, 20 and 40 pieces per unit length, there is a possibility of irregular treatment occurring at the implanting densities of 2 and 4 pieces/cm, but if the implanting density is higher than 20 pieces/cm, there arises a trouble that the electrode pieces 10 are mutually entangled, interfering with adequate discharge treatment of such narrow quarters as the corners 94, etc., of the recessed part. These facts suggests that so far as the implanting density is concerned, about 10 pieces/cm has empirically turned out to be optimum for efficient execution of discharge treatment.

It is also necessary to so set the distal end of the electrode pieces 10 that they will come in contact thoroughly all over the surface of the article 2. This factor is largely determined by the spiral pitch between electrode pieces 10 and 10 which are adjacent each other in the axial direction of the rotary member 9. As hereabove-described, the discharge treatment was executed, with the projection angles $\theta$ set at 5°-30°, respectively, using 2 types of electrode pieces 10 having lengths of 100 mm and 150 mm. It has, then, turned out that if electrode pieces 10 having L at 100 mm is set at 5° for $\theta$, the overlap of the respective effective treating ranges d and d becomes 0, when the pitch P is on the order of 13 mm; and if the length L is 150 mm and $\theta$, 30°, the overlap disappears at a pitch on the order of 50 mm. Accordingly, complete discharge treating will be effected at a range of pitches P 13-50 mm, but if the pitch P is too narrow, mutual entanglement of electrode pieces 10 will occur, resulting in reduced treatment effect. Too large a pitch P has been found to lead to lowered treatment efficiency due to vacant space.

Figure 10:
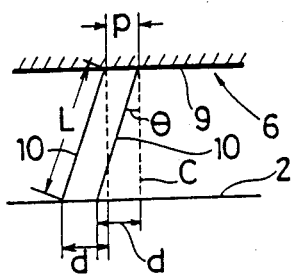
FIG. 10 is a front view for explanation of the reason for the way of setting the spiral pitch.
Figure 11:
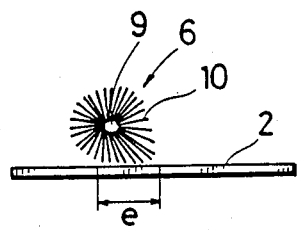
FIG. 11 is a side view for explanation of the effective treating range along the rotating direction.

The effective treatment ranges d and d are taken in the direction criss-crossing to the direction of turning of the electrode pieces 10, thus the lateral direction of the rotary member 9, but evaluation needs to be made on the effective treatment range e along the turning direction, as seen in FIG. 11. The following discharge electrode 6 was used. Each has its electrode pieces implanted, with its $\theta$ at approx. 10°, spiral pitch P 40 mm, and its implanting density at 10 pieces/cm and with their lengths gradually increased from 100 mm to 150 mm in the half circle in the circumferential direction, but their lengths conversely gradually shortened from 150 mm to 100 mm in the remaining half circle. As seen in FIG. 10, the rotational center was set at a height of 100 mm from the article 2 being a PP plate and the discharge treatment was performed, with the number of revolutions set at 100 rpm and the applied voltage at 24 kV. In this instance, the effective treatment ranges e in which a peel strength higher than 1,000 g/cm were achieved in treating times of 15 sec. and 30 sec. were 20 mm and 90 mm, respectively. When similar treatment was performed in a treating time of 15 sec. using electrode pieces all having a uniform length, the effective treatment range e in which peel strength higher than 1,000 g/cm were obtained was 60 mm. These facts suggest that in order to reduce the treatment time (raising the treatment efficiency), it is desirable to have a plurality of electrodes arranged in rows; for example, in the case of the bumper, a maximum treating efficiency has been found obtainable by arranging 30 rotary discharge electrodes, if the bumper's longitudinal length is 1,800 mm.

There is also a desirable range of the number of revolutions for effective treatment. In case the number of revolutions is too low, the centrifugal force is small, resulting in poor thrust-in in the recessed part of the article 2. But if it is too high, there is a possibility of impairing the article 2 by excessively strong contact on the article 2. Consequently, the number of revolution generally should desirably be set at about 30-300 rpm.

Figure 12A:
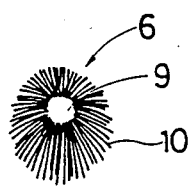
FIG. 12(a) is a side view of a rotary discharge electrode provided with electrode pieces differing in length along the circumferential direction.
Figure 12B:
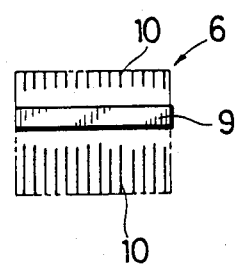
FIG. 12(b) is a front view of the same.
Figure 13:
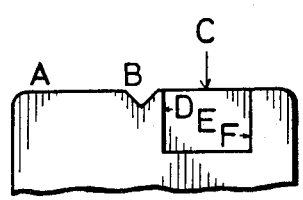
FIG. 13 is a partial side view of a bumper used in making comparison between peel strength as obtained using two different types of discharge electrode.
Figure 14:
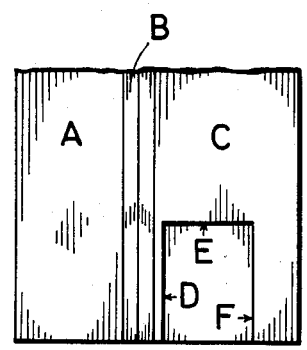
FIG. 14 is a partial plane view of the same, as seen from above.

Electrode pieces differing in length should desirably be combined and implanted, such that, as seen in FIGS. 12(a) and (b), they are successively lengthened, as they advance along the spiral over the half circle, but shorten to their former length in the following half circle. In that way, entanglement is less involved and the number of electrode pieces whose distal ends are put in touch with the surface of the article are equalized, even though there are some differences in the distance between the electrode member and the article. FIGS. 13 and 14 show respective parts A - F of the article being a bumper for test, FIG. 13 showing a side view crisscrossing the longitudinal direction of the bumper, and FIG. 14 a plane view of the same, respectively. The part A represents a first top being one side of the top; the part B, a groove; the part C, a second top, the other side of the top; the part D, a first face of the recess; the part E, a second face adjacent to the part D; and the part F, a third face facing the part D. With regard to these parts A to F, using a first discharge electrode I having electrode pieces equal in length implanted therein and a second discharge electrode II having implanted therein electrode pieces whose lengths are successively lengthened in a first half circle and successively shortened in the remaining half circle, the differences in the peel strength were measured under the conditions of a voltage of 25 kV and a treating time of 15 sec. The results are as shown in Table 1:

TABLE 1

|    | A    | B    | C    | D    | E        | F       |
|----|------|------|------|------|----------|---------|
| I  | 500  | 900  | 1050 | 230  | 200~1000 | 300~750 |
| II | 1170 | 1300 | 1200 | 1050 | 1000<    | 800<    |

The results of the measurements, as seen in this table, suggest that larger peel strength at complex parts D, E and F can be obtained by using the second discharge electrode II.

Figure 15:
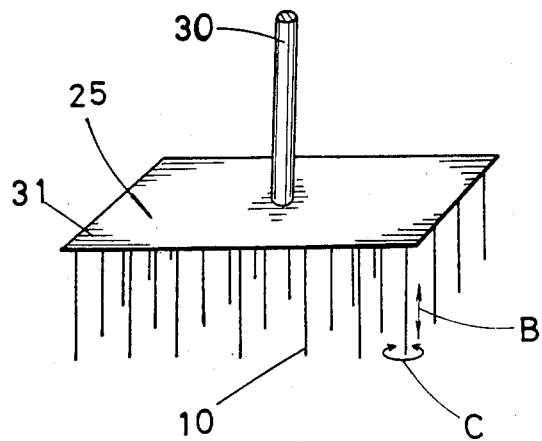
FIG. 15 is a perspective view illustrating a drooping electrode.

As the treating electrode, a drooping discharge electrode 25 as shown in FIG. 15 may be used in place of the rotary discharge electrode. As shown in this figure, this drooping discharge electrode 25 is equipped with a supporting rod 30 and an electrode piece fitting member 31. The supporting rod 30 is extending downward from the supporting frame not shown in this figure and is adapted for level adjustment. The electrode piece fitting member 31 is made of a conductive material formed into a square plate. To this electrode piece fitting member 31, a large number of electrode pieces 10 are installed drooping therefrom; they are aligned in lateral and longitudinal rows, as seen from the bottom side. The electrode pieces 10 used here are similar to those of the said rotary discharge electrode, their lengths are all equal.

Figure 16:
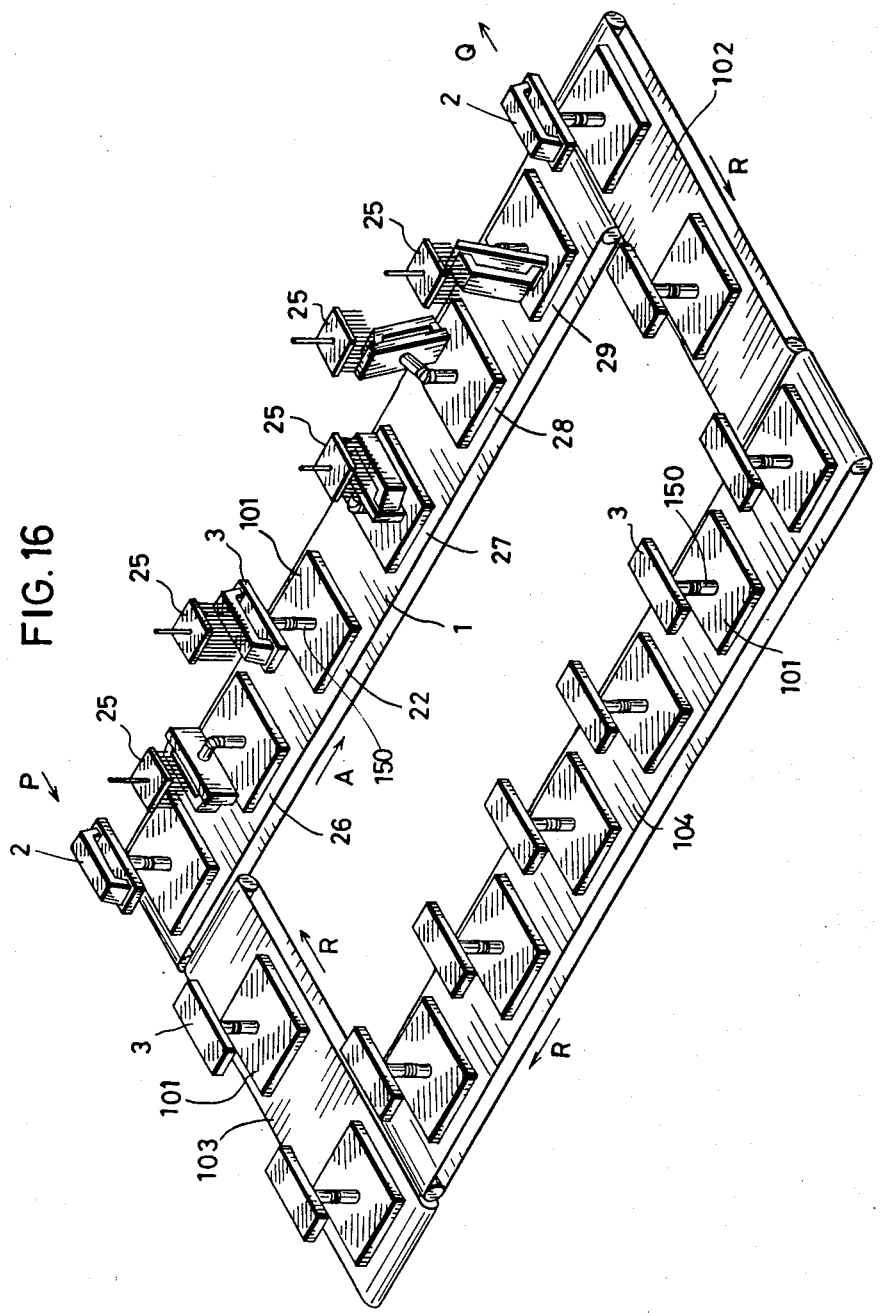
FIG. 16 is a diagram of another embodiment, as seen obliquely from above.

A corona discharge treating system using drooping discharge electrodes 25 according to an embodiment of the invention is illustrated in FIG. 16. As seen in this figure, in this corona discharge treating system. A plurality of drooping discharge electrodes 25 are disposed along the conveying direction A of the conveying means 1. Each of these drooping discharge electrodes 25 performs activation of a part of the surface to be treated. In other words, the respective drooping discharge electrodes arranged along the conveying direction perform activation of a first side, an upper side, a second side, a first end and a second end of the article 2 in sequential order. Regions wherein these drooping discharge electrodes 25 are disposed form a first side treating zone 26, an upper side treating zone 22, a second side treating zone 27, a first end treating zone 28 and a second end treating zone 29 in order along the conveying direction A. In each treatment zone, a drooping discharge electrode 25 is installed. On the conveyor type conveying means 1, a large number of treatment tables 101 are mounted. These treatment tables are circulatingly conveyed along a ringed line composed of two carry-over conveyors 102 and 103 so arranged as to be linked to the end side and the start side of the conveying means 1, as shown by arrow R, and a return conveyor 104 joining these conveyors 102 and 103. The conveying means 1 and the drooping discharge electrodes 25, etc., are housed inside a housing, not shown in this figure. Each base electrode 3 is installed on the top of flexible arm 150; with this arm, it can be tilted back and forth and from side to side. This base electrode 3 and a drooping discharge electrode 25 are respectively linked to a high frequency power source 54. As a high voltage is applied between these two electrodes 3 and 25, as above described, the surface of the article 2 which is contacted by the electrode pieces 10 of the drooping discharge electrode 25 is thereby subjected to the discharge treatment. The article 2 is introduced from the direction of the arrow P to the conveying means, as shown in FIG. 16, to be successively fed in the direction of the arrow A, meanwhile the article is tilted in such a way that the first side surface is turned upward in the first side treating zone; the top, in the top treating zone 22; the second surface, in the second side treating zone 27; the first outside surface, in the first end treating zone 28; and the second outside surface, in the second end treating zone 29. The article 2 which has been subjected to this surface treatment is to be taken out in the direction indicated by another arrow Q. In this embodiment, the drooping discharge electrode 25 is designed to be a vibrating type which, as shown in FIG. 15, is moved vertically through the electrode piece fitting member 31, as shown by an arrow B, and in the horizontal (rotating) direction, as indicated by an arrow C.

Figure 18:
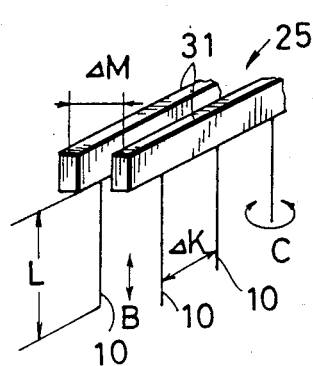
FIG. 18 is a perspective view of the drooping discharge electrode partly enlarged.

FIG. 18 is a schematic view of this vibration system. In this system, the up - down amplitude shall be set in a range of 0–150 mm, for example, to match the step from the flat part to the recessed part of the top 23 of a bumper, being the article 2, whereby the distal end of the electrode piece 10 can be brought into contact with not only the flat part but with the bottom of the recessed part. The speed of the up - down movement (arrow B) is set in the range of 50–200 reciprocations/min., but so as not to entangle electrode pieces 10 for uniform treatment, the vibration should desirably be made at as high a rate as possible. However, it has turned out that as the rate approaches 200 reciprocations/min, the entanglement takes place, resulting in improper access into the details of the article 2. The amplitude of the vibration (along circle, ellipse or other curves) induced by some rotational movement (arrow C) should desirably be on the order of $(\Delta K - 5)/2 - \Delta K/2$ mm, assuming the distance between electrode pieces to be $\Delta K$. In this case, the total of each range covered by the vibration of the distal end of each electrode piece needs to be large enough to cover the overall surface of the article. For example, if the effective treating range covered by one electrode piece 10 is about ±5 mm, the distance between electrode pieces 10 $\Delta K$ being smaller than 5 mm obviates the need for giving any vibration. Setting $\Delta K$ so small as to cause mutual interference from large amplitudes will produce entanglement. This is undesirable. Actually, the distance should desirably be chosen in a range of about 0.1–50 mm. However, when $\Delta K$ is smaller than 2.5 mm, access into details is hindered due to entanglement. On the other hand, if $\Delta K$ is larger than 100 mm, treatment will tend to be uneven. Therefore, $\Delta K$ is actually set in a range of 5–100 mm. The distance $\Delta M$ in the direction perpendicular to the rows at the electrode piece fitting member 31 should desirably be set similarly at 2.5–100 mm. This is because if $\Delta M$ is smaller than 2.5 mm, trouble due to entanglement occurs, but if $\Delta M$ is larger than 100 mm, uneven treatment will result as is the case with the said $\Delta K$. In the current practice, it is set at 10 mm. The length L of the electrode piece 10 should desirably be set in a range of 50–300 mm. The length L, of course, needs to be longer than the step (level difference) between the top-most surface of the bumper and the bottom of its recessed part. Actually, since the length corresponding to that step is on the order of 50–100 mm, it should be well covered in setting the range as specified hereabove. Practically, it is set at 150 mm.

The arrangement for providing vibration of electrode pieces will assure uniform discharge treatment effect not only on the flat part but on the recessed part or any details, which leads to high quantity productivity.

Figure 23:
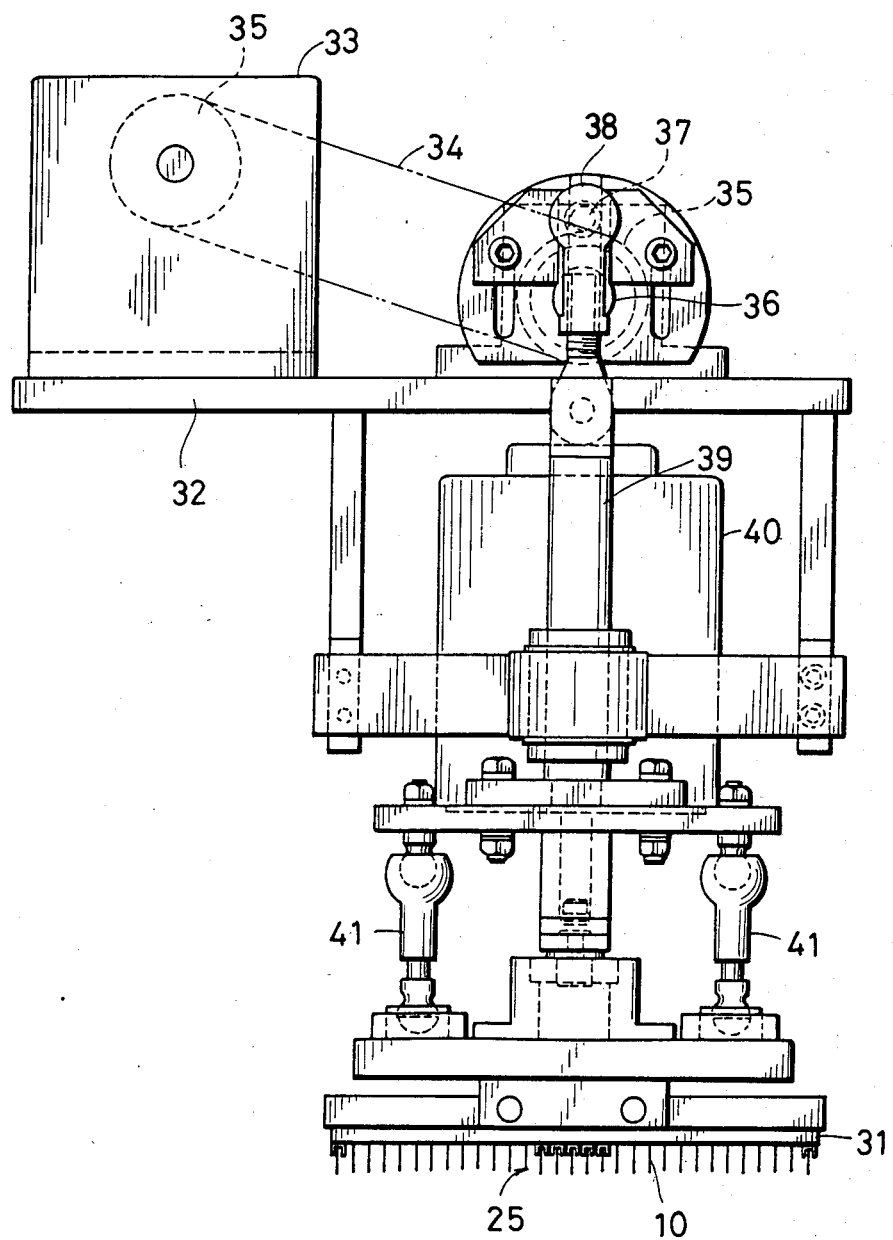
FIG. 23 is a side view illustrating a vibrator.
Figure 24:
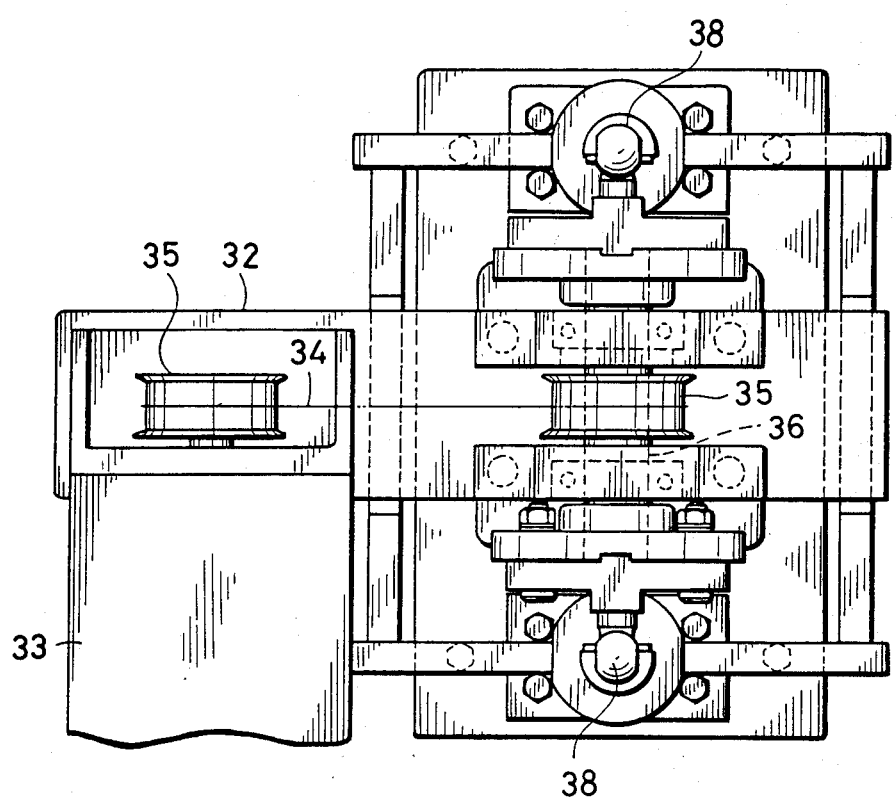
FIG. 24 is a plane view of the same.

A vibrator as shown in FIGS. 23 and 24 can be used to provide such a vibration; the power of the motor 33 installed on the supporting frame 32 is led to a shaft 36 through a belt 34 and a pulley 35; it is, then, transmitted to an eccentric vibrating pin 37 through rotation of the shaft 36, and the movement of the vibrating pin 37 is passed to shaft 39 which slides vertically through a link ball 38 and makes the shaft vibrate vertically, while the horizontal movement (rotation) is produced from the link ball 38 through or by means of a coat 40 with a connector and bottom link balls 41.

Figure 19:
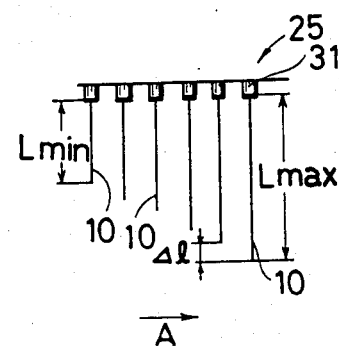
FIG. 19 is a side view illustrating the electrode pieces aligned in a stepped arrangement.
Figure 20:
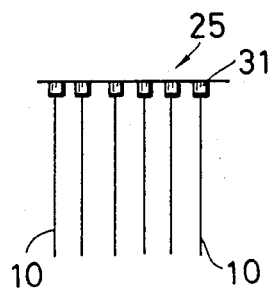
FIG. 20 is a side view showing a state without the stepped arrangement.

The electrode pieces 10 may be so arranged as to be successively made steps by $\Delta l$ in conveying direction A, as seen in FIG. 19. If the depth of the recessed part of the article 2 is, for example, 50 mm, the recessed part treating may be performed by setting the minimum length Lmin. of the electrode piece at 90 mm and the maximum length Lmax. at 140 mm; the minimum value plus the recess depth of 50 mm. The peel strength was obtained at higher than 1,000 g/cm by a treatment with a voltage of 24 kV applied (for approx. 5 sec/cm), using electrode pieces successively lengthened in conveying direction A, as seen in this figure, with the longitudinal distance $\Delta M$ as indicated in FIG. 18 set at 5 mm and $\Delta l$ as given in FIG. 19 at 0.1–2.0 mm. This result was for the flat part of the article; for the recessed part also, a uniform treatment was achieved to a peel strength of about 1,000 g/cm under the same conditions. When electrode pieces 10 have a constant length, as shown in FIG. 20, access to the recessed part is not satisfactory, sometimes resulting in such a low peel strength as less than 200 g/cm in some details of the article. This suggests that the discharge treatment effect may be further enhanced by the arrangement shown in FIG. 19.

Figure 21:
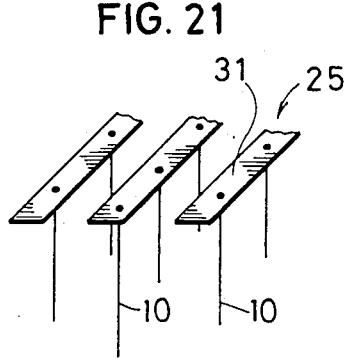
FIG. 21 is a perspective view of electrode pieces being in a staggered arrangement.

It should be noted that when arranging electrode pieces in successive steps as above-described, they may be set to whichever mode, either successively decreasing or increasing their lengths in conveying direction. The electrode pieces with their lengths differing by $\Delta l$ as limited hereabove may be arranged at random in the direction of their rows. Or, as shown in FIG. 21, the electrode pieces may be arranged zigzag in the direction criss-crossing to conveying direction or they may be arranged as shown in FIG. 22, such that the configuration formed as a whole by respective distal end of the electrode pieces may be wavy (or serrated), the lengths of the electrode pieces changing in such a way as short-→long→short.

Figure 22:
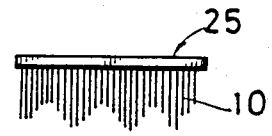
FIG. 22 is a side view of electrode pieces being in a wavy arrangement.

When drooping discharge electrode 25 provided with wavy electrode pieces 10 as shown in FIG. 22 is used, sometimes, the said electrode may travel in a little reciprocal motion horizontally in the direction criss-crossing to conveying direction A of FIG. 16. In this case, the operation range in one direction of the travelling may be set at 1 pitch (for example, the distance between peak and peak of the wave) or at a half pitch (for example, the distance between peak and trough of the wave). In the arrangement, the discharge electrode 25 travels, while the article 2 can travel also. In that way, all long and short ones alike of the electrode pieces 10 of the wavy discharge electrode may be exactly contact with the contour of the article 2. The drooping discharge electrode 25 may have nearly the same length as the longitudinal direction length of the article 2 or may be so formed as to have a length being a fraction of the longitudinal direction length of the article 2 for reducing manufacturing and power costs. In the latter case, reciprocal motion of the discharge electrode 25 covers nearly the total length of the article 2 along its longitudinal direction or the article 2 may reciprocally move.

Figure 25:
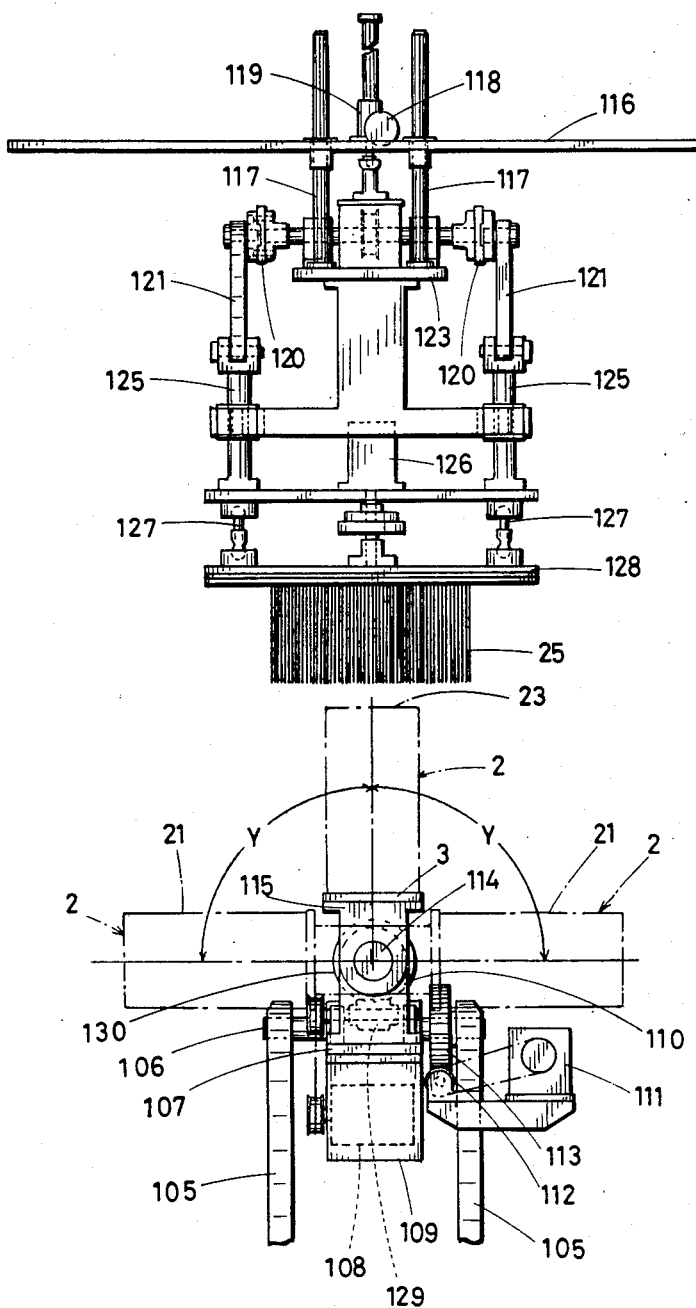
FIG. 25 is a front view of the principal part enlarged of the corona discharge treating apparatus shown in FIG. 16.
Figure 26:
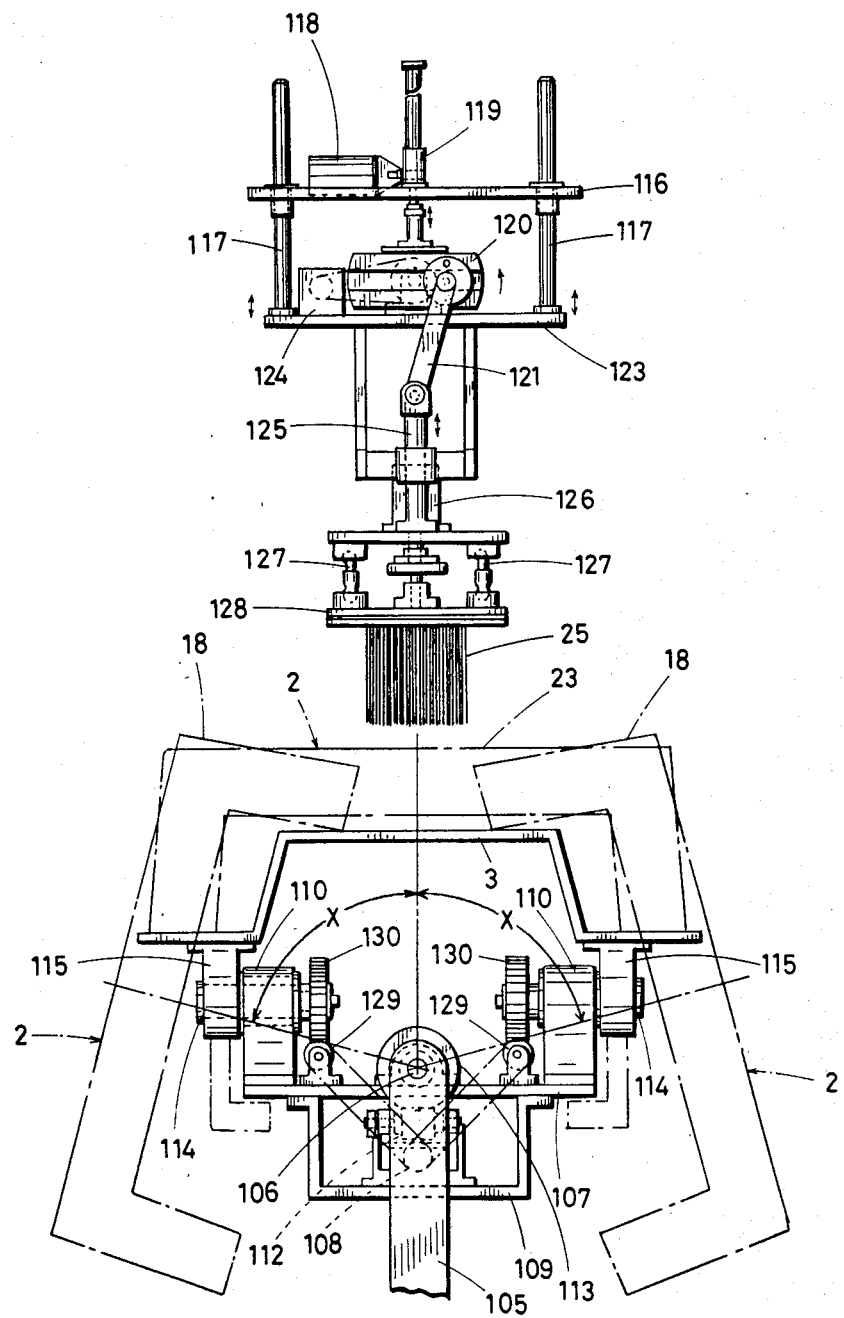
FIG. 26 is a side view of the above-mentioned part.

While in FIG. 16, the treating table 101 for corona discharge treating system is shown in a simplified form, its more concrete form is depicted in FIGS. 25 and 26 with its detailed structure. On each treating table 101, there are provided two bearing frames 105, 105 rising therefrom. On the top of the bearing frame 105, a right-—left tilting frame 107 tiltably supported by a supporting shaft 106 held parallel in conveying direction A is installed. This right—left tilting frame 107 is equipped at its bottom with a motor mounting frame 109 on which the back and forth tilting motor (with a reducer) is fixed. On either side of the upper side of the right-—left tilting frame 107, bearings 110, 110 are fixed facing to each other. This tilting frame 107 is designed to tilt to both sides in an angle of X (75 degrees in the embodiment) with the supporting shaft 106 as the center. In that way, as shown in FIG. 25, while a worm 112 is rotated by a right—left tilting motor 111, a pinion 113 is turned by this worm 112, whereby the supporting shaft 106 is rotated. As a consequence, base electrode 3 tilts, causing the article to be tilted from side to side. This angle is 15 degrees in this embodiment. The base electrode 3 is supported by the supporting frame through supporting shaft 114 inserted in each bearing 110. On the supporting shaft 114, a pinion 130 for back and forth tilting is mounted and with this pinion 130, a worm 129 which is driven by a back and forth tilting motor 108 is meshed. As the pinion 130 is turned by the worm 129, the article 2 is tilted in an angle of Y (90 degrees in the embodiment) in conveying direction A and in the reverse direction thereto, as seen in FIG. 25.

Next, the vibrator for the discharge electrode 25 is detailed as follows: As seen in FIGS. 25 and 26, on the supporting plate 116, there is held a supporting frame 123 through guide bars 117 for vertical motion. The supporting frame 123 is to be adjusted in vertical position by means of an up—down position setting jack—which is driven by an up—down position setting motor 118. Rotary arms 120 are rotated by a motor (180 rpm max) 124 for vertical movement with a reducer; this motion is transmitted by a crank bar 121 to the vertical movement shaft 125 to vibrate it vertically, whereby discharge electrode 25 is vibrated vertically. Besides, with a motor 126 for swinging motion as the swinging motion source, its rotational movement is converted into a swinging movement by link balls 127, to swing the swinging part 128 and by this movement, the discharge electrode 25 is vibrated horizontally. This discharge electrode 25 and the vibrator are to be shifted, as appropriate, to a direction criss-crossing to conveying direction by a reciprocating device (not shown in the figure). As the vibrator, the one shown in FIGS. 23 and 24 may be used.

The drooping discharge electrode 25 may be so composed as not to vibrate at all.

Figure 27:
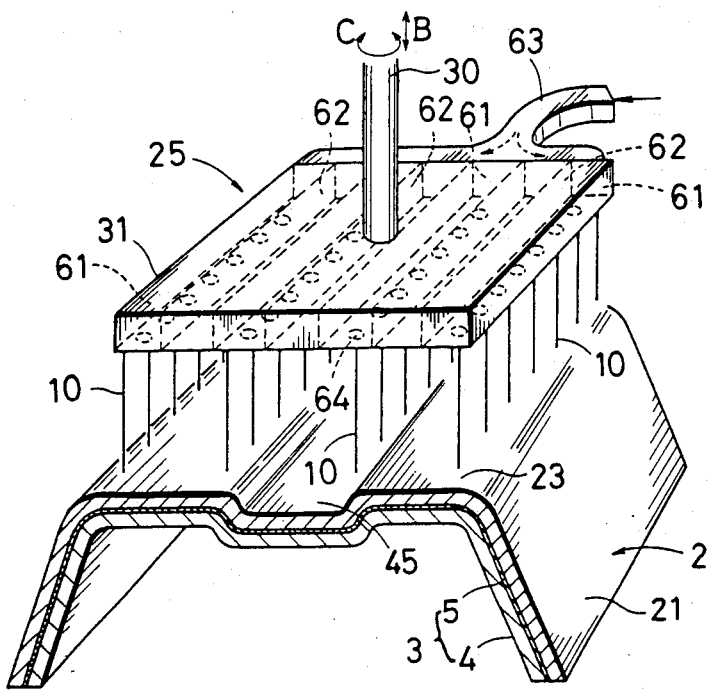
FIG. 27 is a perspective view showing another example of the drooping discharge electrode of the corona discharge treating apparatus of this invention.

For attainment of enhanced treatment efficiency, an arrangement as shown in FIG. 27 may be employed. As shown in this figure, the electrode piece fitting member is square in shape, as seen from above, and hollow. The hollow is divided into a plurality of rows by a plurality of partition plates 62 disposed parallel therein. These hollow parts 61 are communicated with a gas blow-in duct 63 connected to one side of the electrode piece fitting member 31, such that for example, such gas as air or oxygen, etc., is blown into each hollow part 61 to be distributed thereinto. While in the bottom of the electrode piece fitting member 31, a large number of gas blow-out perforations 64 are provided in rows, along the length direction of each division of the hollow part 61, a large number of electrode pieces are held drooping therefrom along one side of these gas blowout perforation 64 row. The supporting shaft 30 and the electrode piece fitting member 31 both are made of a conductive material, so that by applying a high voltage between the base electrode 3 and the discharge electrode 25 therethrough, the corona discharge is made from the distal end of the electrode pieces toward the article 2.

While making the corona discharge, by blowing out gas downward through the gas blow-out perforations 64 via the hollow part 61 of the electrode piece fitting member 31, the gas thus blown out is blown onto the surface of the article 2 to be treated. By this blow-on of gas, the activation on the treating surface is more sufficiently accelerated, whereby not only the surface property is effectively improved, but this improvement can be achieved with smaller consumption of power. Especially, when air or oxygen is used as the gas, the air or oxygen or the like is not blown onto the surface of the article 2 as it is, but such a gas turned into ozone as it passes near the electrode is blown; accordingly, the activation is more sufficiently attained.

If the gas is blown against the face of the article after being warmed, the treating effect is increased, leading to a reduction in treating time. Preferable temperature range is 30° C.–100° C. This effect is represented by experimental results as follows. The surface treatment was conducted for 3 sec. in a blow-out air atmosphere by applying 25 kV voltage on the article. On a surface-treated polypropylene sheet, a two component system polyurethane is applied by spray-coating and the adhesiveness was evaluated by the peel strength at 180°. Results are shown in the table 2:

TABLE 2

| Temperature (°C.) | Peel strength (g/cm) |
|---|---|
| −10 | 650 |
| −5 | 680 |
| 10 | 780 |
| 30 | 900 |
| 55 | 1000 |

The reason why this effect is achieved seems to result from improvement in the adhesiveness after the surface treatment due to the elevated temperature of the article as the warmed gas is blown out.

To the drooping discharge electrode, a vertical vibration in the direction of the arrow B and a rotational vibration in the direction of the arrow C may also be given. And the electrode pieces of different lengths may be employed, to be put in arrangements as shown in FIGS. 19, 21 and 22. The blow-in of gas may be performed through the supporting shaft 30. This supporting shaft itself is not necessarily required to have conductivity.

Figure 28:
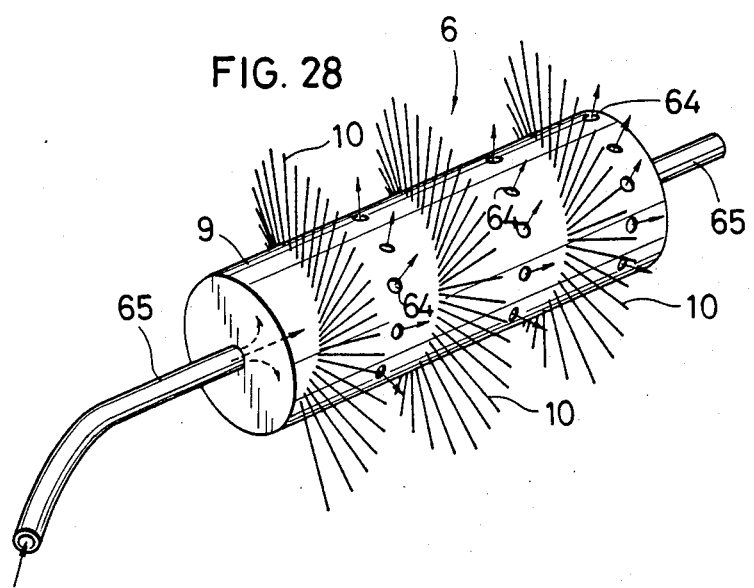
FIG. 28 is a perspective view of another embodiment of the rotary discharge electrode.

FIG. 28 illustrates a rotary type discharge electrodes 6 provided with the gas blow-out means. This discharge electrode 6 is equipped with a hollow cylindrical rotary member 9 as the electrode piece fitting means, so that through the inside of the conductive rotary supporting shaft 65 attached to the center of the end of the member, gas is blown into the inside of the rotary member 9. In the outer circumference of the rotary member 9, a plurality of electrode pieces 10 are spirally implanted; they are extended in a brush shape in radial direction and, moreover, between the spiral row of the electrode pieces, gas blow-out perforations 64 are also spirally arranged. In this assembly, the electrode pieces are perpendicularly extended from the outer circumferential surface of the rotary member 9, but they may be inclined somewhat in one direction along the said supporting shaft 65. As the gas to be blown out toward the discharge space, may be used according to the purpose of surface-treatment, besides air, nitrogen, oxygen, carbon dioxide, carbon monoxide, ammonia, nitrogen oxides, halogenated carbons, halogenated hydrocarbons, vinyl compounds, argon, helium, etc. These gas may be used independently or two or more kinds may be mixed for use. The same is true of the drooping discharge electrode of FIG. 27.

The electrode piece 10 is formed by plying a large number of conductive monofilaments a made of stainless steel as the stock material; as the monofilament a, use of an austenitic stainless steel fiber (Japanese Industrial Standard SUS 27-43), "NASLON", manufactured by Nippon Seisen Co., Ltd., is preferable. The number of monofilaments plied is 10-3,000. As the monofilaments a, those of diameters $4\mu$-$50\mu$ or other are available. In this embodiment, 4 types having diameters $8\mu$, $10\mu$, $12\mu$ and $15\mu$, which were considered preferable, were examined. Their mechanical, electrical or other properties are as follows:

| | |
|---|---|
| Specific gravity | 7.9 g/cm$^2$ |
| Initial tensile resistance | 19000 kg/mm$^2$ |
| Cutting strength | 150~250 kg/mm$^2$ |
| Cutting resistance | 2.7~4.5 g/d |
| Knot strength | 106~140 kg/mm$^2$ |
| Knot resistance | 1.9~2.5 g/d |
| Elongation percentage | 1.0~2.0% |
| Elastic modulus of elongation | 100 ... (1.0%) |
| (At the time of 3% elongation) | 66 ... (1.5%) |
| Water content (Standard condition) | 0% |
| Melting point | 1400~1450° C. |
| Thermal conductivity | 0.039 cal/cm · sec °C. |
| Specific heat | 0.12 cal/g. °C. |
| Specific electric resistance | 72 $\mu\Omega$-cm |
| Influence of acids | Stable in nitric acid and phosphoric acid Affected with sulfuric and hydrochloric acid |
| Influence of alkalis | Unaffected |

Figure 17:
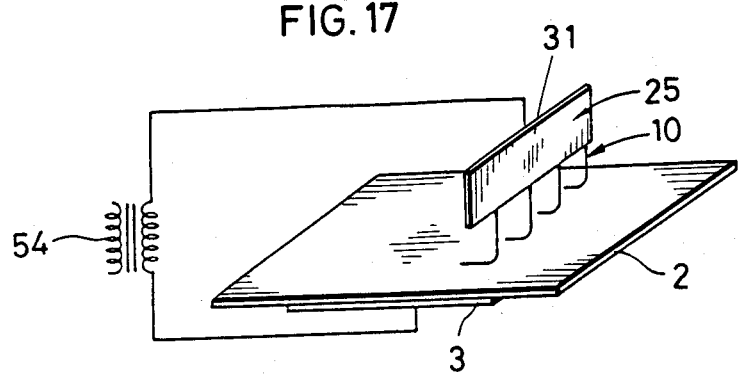
FIG. 17 is a wiring diagram between the drooping discharge electrode and the base electrode.

Electrode pieces 10 formed by plying 200 mono-filaments a of $12\mu\phi$, for example, of those having these properties, are fitted to a drooping discharge electrode 25 installed facing downward a base electrode, as shown in FIG. 15. The drooping discharge electrode 25 are tested as shown in FIG. 17. On a base electrode 3, is placed a flat plate shape article 2 made of PP material; upward thereof longitudinally oriented electrode piece fitting member 31 is installed and from this electrode fitting member 31, electrode pieces 10 formed by plying 200 monofilaments of $12\mu\phi$, for example, are slung at equal intervals. Between the base electrode 3 and the electrode fitting member 31, a high frequency power source 54 is linked, to apply a high voltage therebetween, and the article 2 and the electrode piece 10 are movable relative to each other by moving either one of them. In this way, the surface of the article 2 is subjected to the discharge treatment, for attainment of improved surface peel strength as intended. Test results obtained using the electrode pieces 10 are as shown in the Table 3:

TABLE 3

| Distance between electrodes | Treating time | Peel strength | Secondary peel strength after immersion in water of 50° C. for 10 days |
|---|---|---|---|
| 5 mm | 10 sec/cm | Not peeled | 1040 g/cm |
| 10 mm | 10 sec/cm | 1270 g/cm | 1160 g/cm |

This table suggests that distinct improvements in the peel strength may be achieved by using such electrode pieces 10. The improvements in the peel strength were similarly achieved with electrode pieces of different diameters, e.g., $8\mu\phi$, $10\mu\phi$ and $15\mu\phi$, 100, 200, 300, 1000 and 3000 of which were plied in various combinations.

When the electrode piece is composed by plying together a large number of monofilaments having very minute diameters, not fragile but not too strong and firm an electrode may be obtained. It makes a slight touch on the article surface and because of its structure being composed of a large number of monofilaments, stable sure touch is realized. Accordingly, not only the discharge effect is stabilized and ensured, but both the electrode pieces and the article are free from injury. With a large number of monofilaments being merely bundled without being plied together, similar discharge effect may be achieved, but such a piece, being liable to fluffing, is unsuitable for use as an electrode piece.

To be sure, the electrode piece is not limited to that of stainless steel.

The high voltage source for use in corona discharge treatment should desirably have a voltage of 10 kV-50 kV (more preferably 10 kV-30 kV) and a frequency of 1 kHz-100 kHz. The power output should be appropriately chosen to suit the object. For the power circuit, hitherto well known one may be used, but it is desirable that the discharge current which generates plasma can be arbitrarily controlled according to the load and that the frequency and the output of the high voltage source are adjustable to optimal levels. Besides, by arbitrarily setting the time for producing the high voltage output by means of a timer, the treating time should desirably be fixed. With a stabilizing power source provided in the electric circuit on which high voltage is to be applied, even surfaces of molded products with complex configurations may be subjected to uniform plasma treatment.

The corona discharge treating system is not limited to the embodiment. For example, in the embodiment shown in FIG. 1, the rotary discharge electrodes and the drooping discharge electrodes may be jointly used, for example,by employing the drooping discharge electrode in the top treating zone and so forth. Or in the embodiment of FIG. 1, the drooping discharge electrodes may be used at all stages or in the embodiment of FIG. 16, the rotary discharge electrodes may be put to use at all stages. Regarding the treating zone, if divided into a plurality of stages, for example in the embodiment of FIG. 16, the top treating zone and the first end treating zone may be integrated into a single treating zone, and so forth. As for a part of the surface to be treated of the article, it can be completely treated either by one discharge electrode alone or by plural discharge electrodes. That is, the plurality of discharge electrodes are arranged in the conveying direction, each of them can be directed either for treatment of different parts of the surface to be treated or for treatment of the same part by several electrodes. When using the rotary discharge electrodes, two types differing in spiral direction may be made available and installed or those identical in spiral direction may be so arranged as to turn in different directions. The rotary discharge electrode may have its rotational central axis set appropriately inclined, besides setting it parallel or perpendicular to conveying direction A. The drooping discharge electrode may have its electrode piece fitting member obliquely set. The base electrode 3 may have formed on its surface, as required, a layer of a dielectric material, e.g., glass, ceramic, plastic, enamel, asbestos, marble, slate, mica, etc. It is possible either to arrange the base electrode so as to be movable following the article or to arrange a plurality of them stationary along the conveying direction. In any of these cases, it is preferable to adapt to configuration of the article in order to attain high effect of the treatment.

As hereabove described, in the corona discharge treating system of this invention, the treating system is provided with conveying means for conveyance of the article, a plurality of discharge electrodes are disposed in the conveying direction of the article, each of these discharge electrodes performs activation of a part of the surface to be treated of the article so that the whole surface of the article may be completely treated when the article has passed through all of these discharge electrodes. Therefore, even in the case of treating an article with many surfaces respectively facing to different directions, treatment thereof by applying corona discharge can be efficiently performed, enabling thereby mass production of surface treated products. Furthermore, since each of the plurality of discharge electrodes performs activation of a part of the surface to be treated taking over a partial surface treatment work, it becomes quite easy to carry out the treatment under the condition most preferable for treating each of the surface to be treated of the article, and as a result every part of the surface to be treated can be exactly activated.

We claim:

1. A corona discharge treating system comprising:
    a plurality of treating zones, each treating zone being provided for treating different parts of a surface of an article to be treated, each treating zone having at least one discharge electrode;
    conveying means for connecting each said treating zone; and
    a base electrode coming in contact with the article to be treated in each treating zone, wherein high voltage is applied between said base electrode and said discharge electrode to perform corona discharge in each treating zone to activate a part of the surface of the article to be treated, said conveying means conveying the article, whose part of the surface is activated, to a next treating zone to activate another part of the surface of the article.

2. A corona discharge treating system according to claim 1 wherein the discharge electrode is a rotary discharge electrode having a large number of conductive electrode pieces implanted like a brush in the outer circumference of the rotary member.

3. A corona discharge treating system according to claim 2 wherein electrode pieces are spirally implanted in the external circumference of a rotary member, with the extending direction of each piece is inclined at a definite angle in a direction along the axial line of the rotary member, with the axial line rising at a right angle from the periphery of the rotary member as standard.

4. A corona discharge treating system according to claim 2 or 3 wherein the lengths of electrode pieces are different.

5. A corona discharge treating system according to claim 4 wherein the electrode pieces are so arranged that their lengths are gradually lengthened over the half circle in their turning direction, but gradually shortened over the remaining half circle.

6. A corona discharge treating system according to claim 1 wherein the discharge electrode is a drooping discharge electrode having a plurality of electrode pieces drooping from an electrode fitting member.

7. A corona discharge treating system according to claim 6 wherein the lengths of the electrode pieces are different.

8. A corona discharge treating system according to claim 7 wherein a plurality of electrode pieces are arranged in order from short to long ones.

9. A corona discharge treating system according to claim 7 wherein a plurality of electrode pieces are cut at their distal ends to have a wavy or serrate pattern provided by these ends.

10. A corona discharge treating system according to any one of claims 6 through 9 further comprising a vibrating means for vibrating the electrode pieces.

11. A corona discharge treating system according to claim 10 wherein the directions of vibration are vertical and horizontal.

12. A corona discharge treating system according to claim 20 wherein rotary discharge electrodes having a plurality of conductive electrode pieces implanted like a brush in the periphery of a rotary member and drooping discharge electrodes having a large number of electrode pieces drooping from an electrode fitting member are used in combination as the discharge electrodes.

13. A corona discharge treating system according to claim 2 or 3 wherein the electrode piece comprises a fine string by plying together a plurality of conductive metal fibers of very minute diameters.

14. A corona discharge treating system according to claim 13 wherein the metal fiber is made of stainless steel.

15. A corona discharge treating system according to claim 1, 2 or 3 wherein the base electrode consists of a plastic mold fitted to the configuration of the article and a conductive metal layer formed on its surface facing to the article.

16. A corona discharge treating system according to claim 1, 2 or 3 further comprising a changing means for changing the position of said article.

17. A corona discharge treating system according to claim 1, 2 or 3 further comprising a means for directing a gas to the surface of said article.

18. A corona discharge treating system according to claim 17 wherein said gas is blown out after being warmed.

19. A corona discharge treating system according to claim 18 wherein gas is air or oxygen.

* * * * *

UNITED STATES PATENT AND TRADEMARK OFFICE
CERTIFICATE OF CORRECTION

PATENT NO. : 4,772,788

DATED : September 20, 1988

INVENTOR(S) : TSUTSUI et al

It is certified that error appears in the above-identified patent and that said Letters Patent is hereby corrected as shown below:

Column 16, line 2, after "angle" insert -- with respect to a line rising at a right angle from the peripheral of the rotary member.-- .

Column 16, line 3, delete ", with the axial line rising at a right angle" and insert therefor --.--.

Column 16, line 4, delete in its entirety.

Column 16, line 34, delete "20" and insert therefor --1--.

Signed and Sealed this

Eleventh Day of April, 1989

Attest:

DONALD J. QUIGG

Attesting Officer

Commissioner of Patents and Trademarks